Sept. 29, 1936. W. E. WINE Re. 20,121

RAILWAY CAR

Original Filed April 4, 1930 7 Sheets-Sheet 1

Inventor

William E. Wine

By Retter & Meeklin his Attorneys

RAILWAY CAR
Original Filed April 4, 1930 7 Sheets-Sheet 2
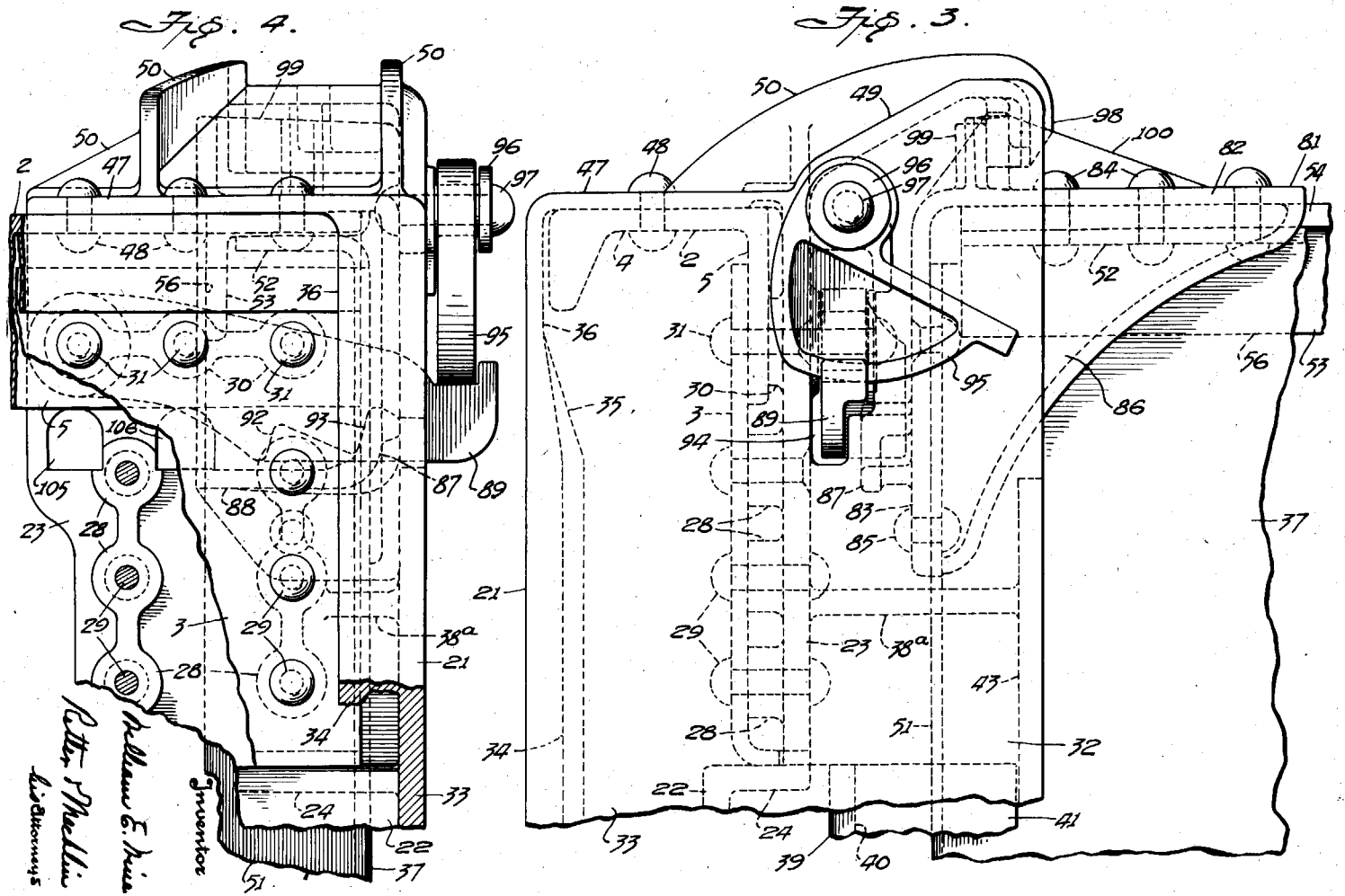

Sept. 29, 1936. W. E. WINE Re. 20,121

RAILWAY CAR

Original Filed April 4, 1930 7 Sheets-Sheet 3

Inventor

William E. Wine

By Ritter & Theeplin his Attorneys

Sept. 29, 1936. W. E. WINE Re. 20,121

RAILWAY CAR

Original Filed April 4, 1930. 7 Sheets-Sheet 4

Inventor

William E. Wine

By Ritter & Mechlin his Attorneys

Sept. 29, 1936. W. E. WINE Re. 20,121

RAILWAY CAR

Original Filed April 4, 1930 7 Sheets-Sheet 5

Inventor

William E. Wine

By Ritter & Mechlin his Attorneys

RAILWAY CAR

Original Filed April 4, 1930 7 Sheets-Sheet 6

Invento

William E. Wine

By Ritter & Meeklin his Attorney

Sept. 29, 1936. W. E. WINE Re. 20,121

RAILWAY CAR

Original Filed April 4, 1930 7 Sheets-Sheet 7

Inventor

William E. Wine

By Fitter & Mechlin his Attorneys

Reissued Sept. 29, 1936

Re. 20,121

UNITED STATES PATENT OFFICE 20,121

RAILWAY CAR

William E. Wine, Toledo, Ohio, assignor to Wine Railway Appliance Company, Toledo, Ohio, a corporation of Ohio Original No. 1,853,248, dated April 12, 1932, Serial No. 442,508, April 4, 1930. Application for reissue November 14, 1932, Serial No. 642,686

54 Claims. (Cl. 105—406)

My invention relates to railway cars and more particularly to that type commonly known as drop end door gondola cars. As is well known the ends, hereinafter called doors, of this type of car are movably mounted so that they may be disposed either in overlapping relation with the floor of the car to permit the loading of material of greater length than the car or in substantially upright positions to perform the normal functions of car ends. When the end doors overlap the floor of the car they are considered as being in open position and when they are disposed substantially upright they are considered as being in closed position.

The principal object of the invention is to provide improved means for maintaining the doors in closed position.

Another object of the invention is to provide improved means for movably associating the doors with the car.

A further object of the invention is to provide means for drawing the side walls of the car inwardly as the doors assume closed position.

A still further object of the invention is to provide means affording a fulcrum whereby a removable lever may be used to force the door towards closed position and to draw the side walls of the car inwardly.

A still further object of the invention is to provide an improved corner post particularly applicable to this type of car.

A primary feature of the invention consists in forming the side walls of the car with rigid portions adapted to cooperate with means rigid with the door for pivotally associating the door with the car.

Another feature of the invention consists in providing the door with members adjacent the side edges thereof adapted to cooperate with means secured to the side walls of the car for pivotally associating the door with the latter, said means being so formed as to permit withdrawal of the door from the car.

A still further feature of the invention resides in providing a drop end door gondola car with corner posts having portions rigidly secured to the horizontal and vertical legs of the adjacent side top rails.

A still further feature of the invention resides in integrally forming the corner posts with improved means adapted to interlock with the door when the latter is in closed position to prevent spreading of the car sides.

A still further feature of the invention consists in providing the car with a plurality of pairs of members, one member of each pair being provided with a beveled surface cooperable with the other member of its pair whereby when the door is moved toward closed position said pairs of members are adapted to draw the side walls inwardly.

Other and more specific features of the invention residing in advantageous forms, combinations and relations of parts will hereinafter appear and be pointed out in the claims.

In the drawings illustrating a preferred embodiment of the invention:

Figure 3 is an enlarged fragmentary view of the upper corner of the construction illustrated in Figure 1.

Figure 4 is an enlarged fragmentary view, parts thereof being broken away, of the upper portion of the construction illustrated in Figure 2.

Figure 7 is an enlarged end elevational view, parts thereof being broken away, of the lower portion of the construction illustrated in Figure 1.

Figures 1, 2:
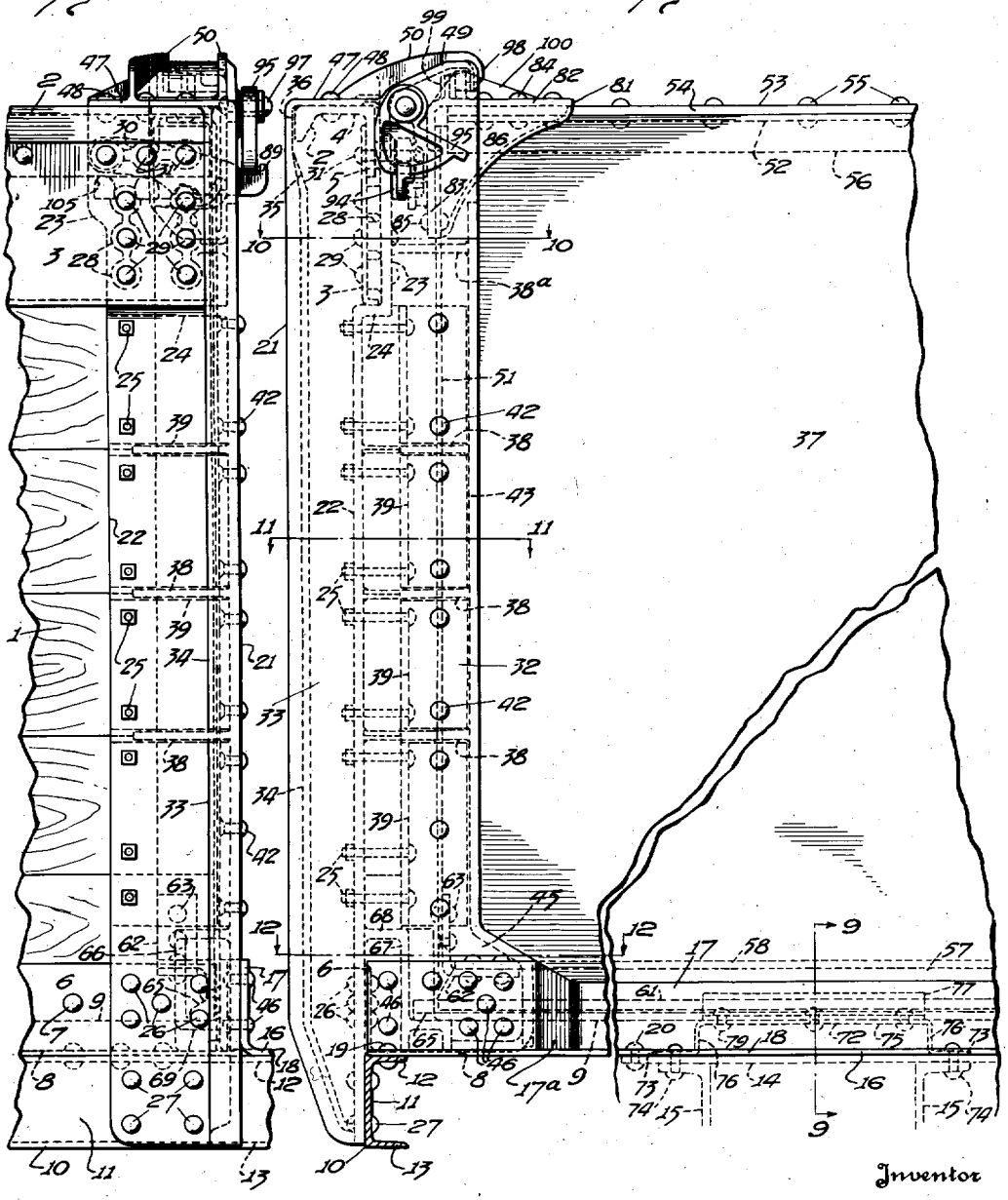
Figure 1 is a fragmentary end elevational view of a drop end door gondola car.
Figure 2 is a fragmentary side elevational view of the construction illustrated in Figure 1.
Figure 5:
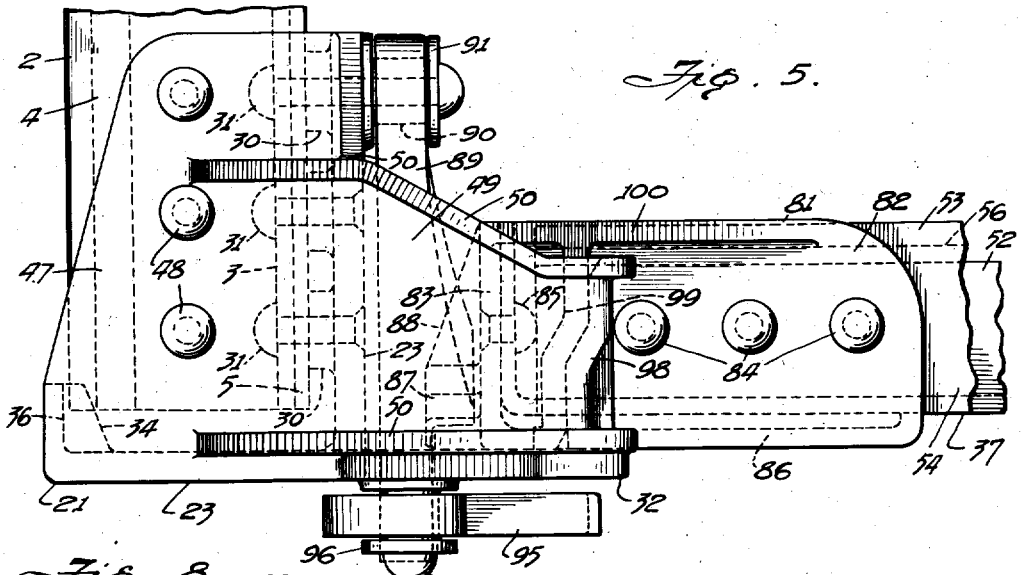
Figure 5 is a plan view of the car adjacent one corner thereof.
Figure 8:
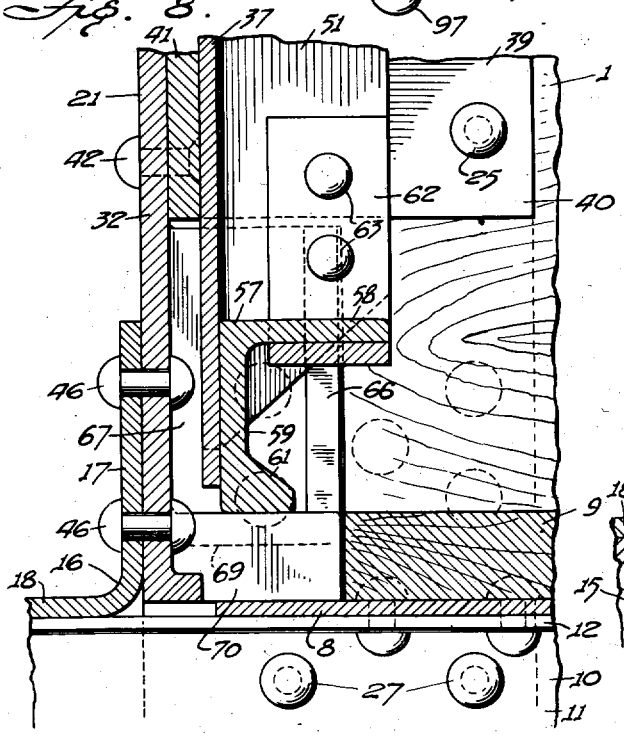
Figure 8 is a sectional view taken on line 8—8, Figure 7.
Figure 10:
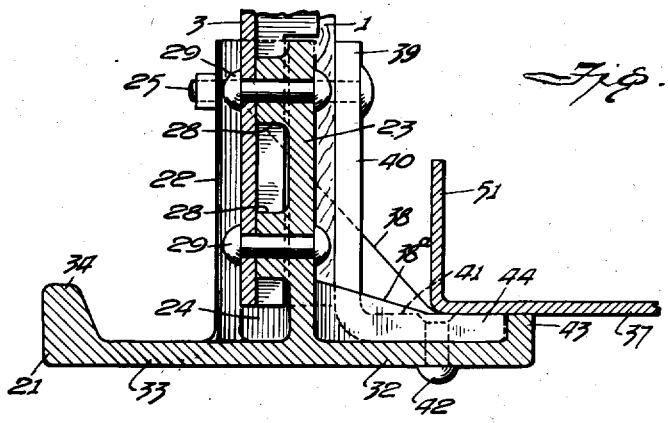
Figure 11:
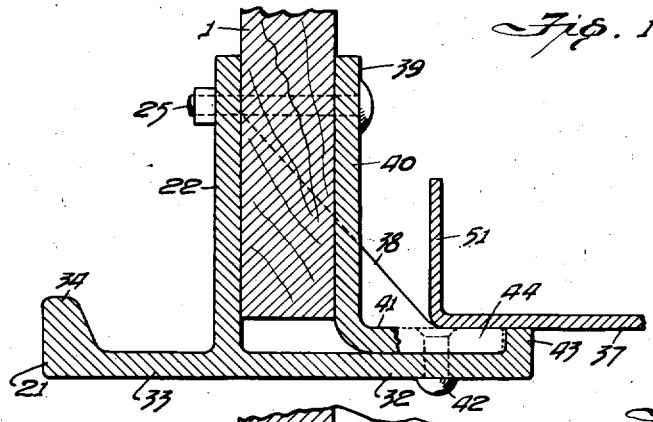
Figure 12:
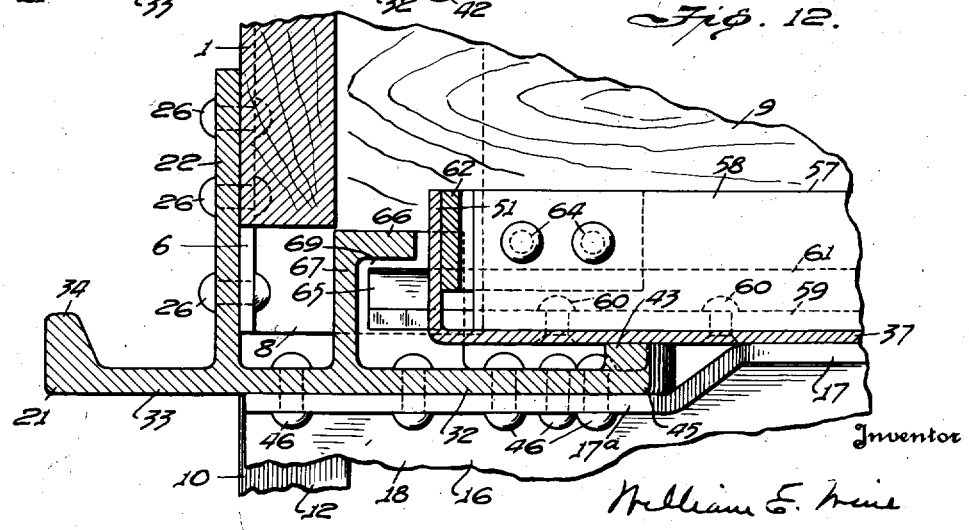

Figures 10, 11, and 12 are enlarged sectional views taken respectively on lines 10—10, 11—11, and 12—12, Figure 1.

Figure 13:
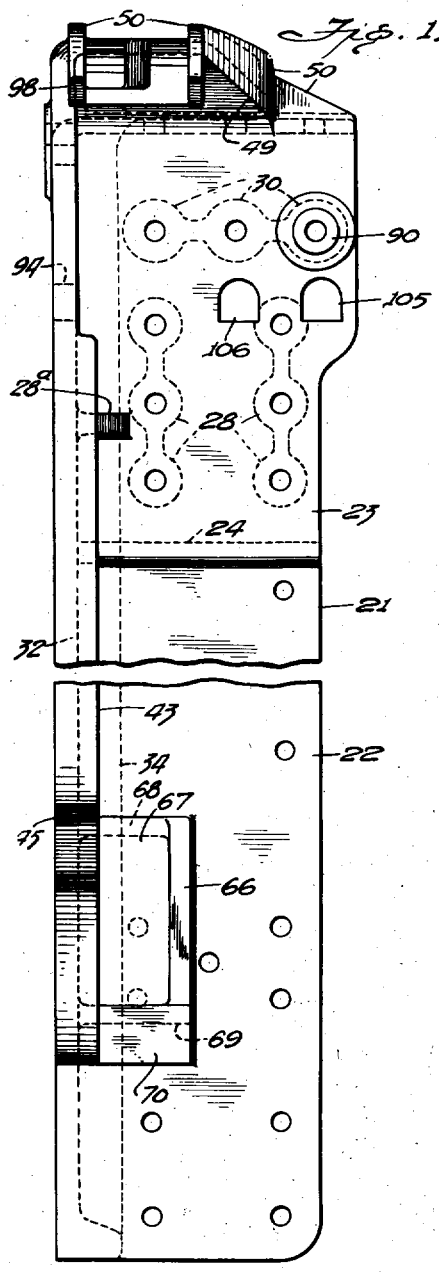
Figure 14:
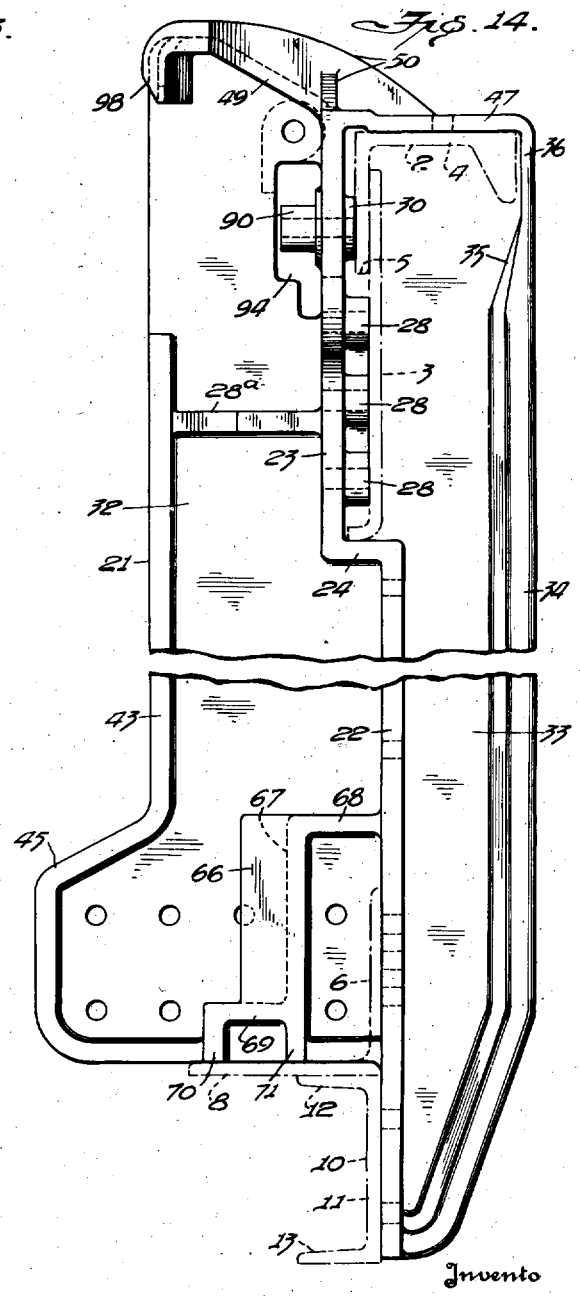

Figures 13 and 14 are elevational views of the corner post.

Figures 15, 16, 17, 18:
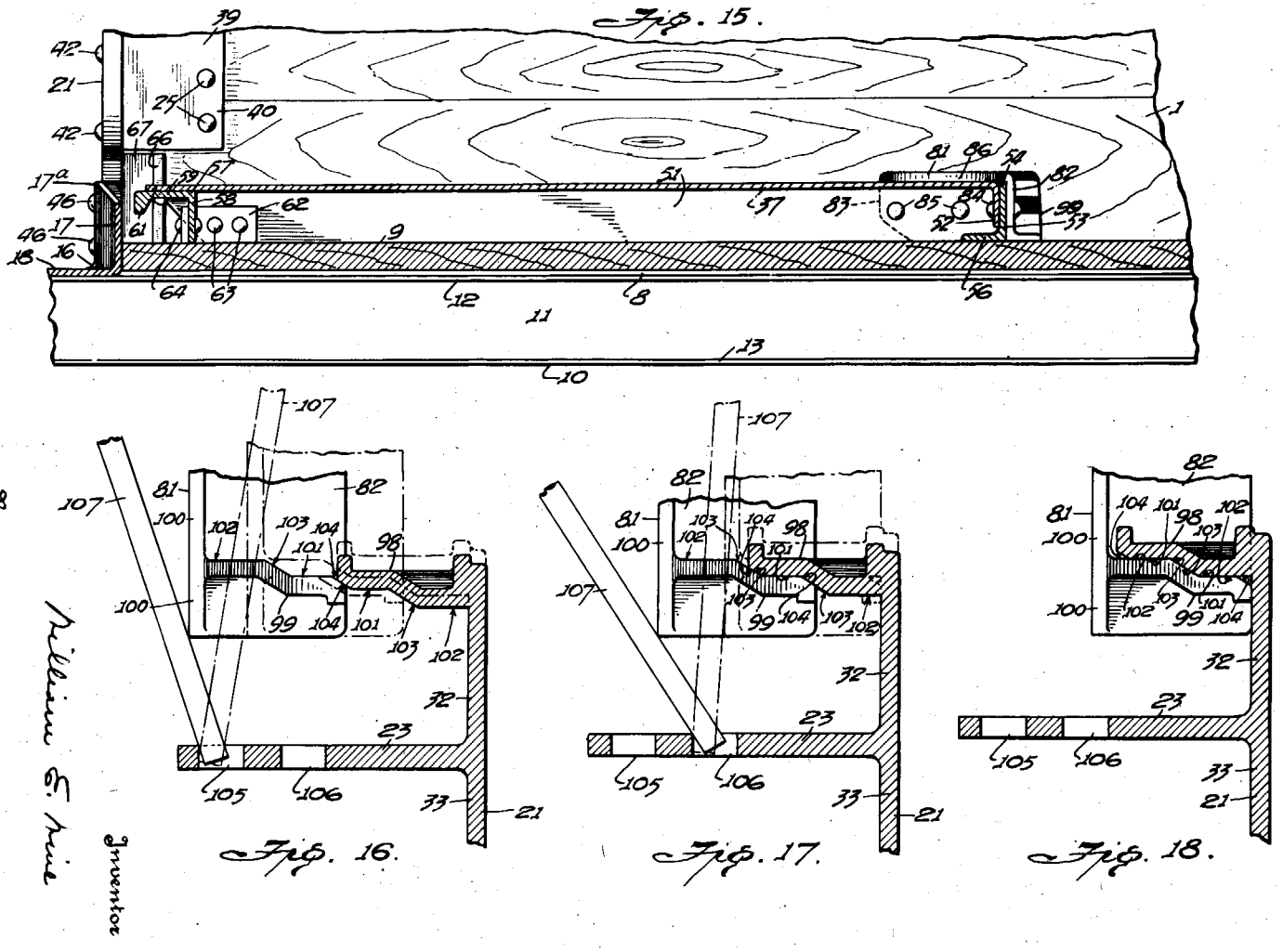

Figure 15 is a fragmentary longitudinal sectional view of the car showing the door in open position.

Figures 16, 17, and 18 are horizontal sectional views of one of the corner posts and adjacent portions of the end door, showing the latter in different positions of closure.

While the drawings illustrate in detail the construction of the car adjacent only one corner thereof it is to be understood that the construction is duplicated at each corner and that the mechanism illustrated for maintaining the door in closed position is only one of the two employed for each door.

Referring more particularly to the drawings 1 indicates one of the side walls of the car which in the present embodiment of the invention consists of a plurality of wooden boards or planks. Interposed between the top board and the top side rail 2 is a longitudinally extending metal plate 3 which is described in detail in my Patent No. 1,698,865, January 15, 1929. Although the side top rail may be of any desired or convenient shape I prefer to use a bulb angle having a substantially horizontal flange 4 and a substantially vertical flange 5, the latter being rigidly secured to the longitudinally extending plate 3 in overlapping relation to its inner face.

Secured to the bottom plank or board of the car siding by a suitable means, such as bolts 7, is a longitudinally extending angle-shaped member having a vertical flange 6 overlapping the outer face of the siding, and a horizontal flange 8 which extends inwardly and underlies the floor 9 of the car which, like the car sides, may also be of wood. Extending beneath this angle-shaped member is a channel member 10 having a substantially vertical web 11 and upper and lower inwardly projecting flanges 12 and 13, respectively, the former being rigidly secured to the flange 8 of the angle member. Thus, each side sill of the car is formed of two parts, namely, the angle-shaped member which preferably terminates inwardly of the end walls of the car and the channel-shaped member which preferably projects a short distance beyond the latter.

The wooden floor 9 may conveniently rest upon a top cover plate 14 of the car center sill which, in addition to this plate, is formed by spaced longitudinally extending beams 15. The center sill, like the channel-shaped member of the side sill, projects beyond the end walls of the car and the projecting ends of these sills are connected by an end sill 16 which is preferably of angle-shape and has an upwardly projecting substantially vertical flange 17 and an outwardly projecting substantially horizontal flange 18. The flange 18 rests upon the upper flange 12 of the channel member 10 and upon the top cover plate 14, being secured to the flange by rivets 19 and to the plate by rivets 20.

Secured to the side wall of the car is a corner post 21 which may advantageously be of T-shape, the stem of which extends longitudinally of the car while the flange thereof extends transversely. The stem is formed with relatively offset portions 22 and 23 connected by a preferably horizontal portion 24, the upper surface of which is in the plane of the upper surface of the top board of the siding. The lower portion 22 of the stem of the corner post overlaps the outer face of the siding and is secured thereto by a plurality of bolts 25. This portion of the stem of the corner post also overlaps the outer faces of the vertical flange 6 of the angle member and the web 11 of the channel, being secured to these parts by rivets 26 and 27, respectively. The upper portion 23 of the stem overlaps the inner faces of the metal plate 3 and of the depending or vertical flange 5 of the side top rail. To properly space the plate 3 from adjacent portions of the stem 23 the latter is integrally formed with a plurality of outwardly projecting bosses 28 which abut the inner face of the plate and are provided with apertures for receiving connecting rivets 29. Furthermore, the portion of the stem 23 immediately adjacent the flange 5 of the top rail is formed with bosses 30 which abut the inner face of the latter. These bosses are likewise formed with apertures to receive rivets 31 for connecting the corner post and top rail.

One portion of the flange of the T-shaped corner post projects inwardly from the stem thereof while the other portion of the flange projects outwardly from the stem, these portions being respectively designated by the reference numerals 32 and 33. The outwardly projecting portion 33 extends slightly beyond the outer edge of the side top rail and its marginal edge is preferably provided with an inwardly projecting rigidifying bead or rib 34. Adjacent the top of the corner post the rib 34 decreases in width, as at 35, to form a relatively thin flange 36 which overlaps the outer end of the horizontal flange 4 of the top rail. Adjacent its lower end the outwardly projecting portion 33 preferably decreases in width to a point adjacent the lower end of the corner post.

The inwardly projecting portion 32 of the flange of the corner post is adapted to overlap the outer face of the drop end door 37 and forms means for limiting outward movement of the door. To rigidify this portion of the flange it may be advantageously integrally connected to the stem by a plurality of substantially triangularly shaped ribs or flanges 38. As the wooden siding extends to substantially the portion 32 of the corner post, the boards constituting the siding are gained out or cut away to permit the flanges 38 to extend therebeyond. Above the wooden siding the inwardly projecting portion 32 of the flange is integrally connected to the stem of the corner post by a rib or flange 28ᵃ of somewhat less depth than the flanges 38. To further rigidify the corner construction of the car and in particular the inwardly projecting portion 32 of the flange of the corner post a plurality of angle-shaped members 39 may be conveniently employed. These angle members are disposed on opposite sides of the reinforcing ribs 38 and each is fashioned with a leg or flange 40 overlappingly secured to the inner face of the wooden siding by the bolts 25 and with a leg or flange 41 overlappingly secured by rivets 42 to the inner face of the flange portion 32 of the corner post. Thus the flanges 41 of the angle members are interposed between the corner posts and door and are adapted to engage the outer face of the latter when it is in closed position. The inwardly projecting portion 32 of the flange extends somewhat beyond the inner edges of the flanges 41 of the angle members 39 and is preferably integrally formed with an inturned rigidifying rib or flange 43 which terminates substantially in the plane of the inner faces of the flanges 41 and is adapted to contact with the outer face of the door. As shown in Figures 10 and 11 the flanges 38 and 38ᵃ are formed with extensions 44 which are formed integrally with the inturned flange 43.

For a purpose that will hereinafter appear, the lower portion of the inwardly projecting portion 32 of the flange of the corner post is enlarged as at 45. This portion is disposed between the door and the upwardly projecting vertical flange 17 of the end sill, being rigidly secured to the latter by a plurality of rivets 46. Where the flange 17 of the end sill overlaps the corner post it is offset outwardly as at 17ᵃ. Although the stem of the corner post extends downwardly beyond the end sill for attachment to the channel member of the side sill the inwardly projecting portion 32 of the flange terminates adjacent the lower edge of the end sill.

At the upper end of the corner post the stem and outwardly projecting portion 33 of the flange are integrally connected by a substantially horizontal portion 47 which overlaps the upper face of the horizontal flange or leg 4 of the side top rail and is rigidly secured thereto by a plurality of rivets 48. The inwardly projecting portion 32 of the flange is also integrally connected to the stem by a portion 49 and in order to reinforce the portions 47 and 49 they may be formed with a plurality of upwardly extending ribs 50. From the foregoing it will be readily apparent that a corner post constructed in accordance with the foregoing description will, when applied to the car in the manner described, adequately and efficiently reinforce and rigidify the end portions of the side walls of the car.

While the drop end door 37 may be made of any desired material it is preferably fashioned from sheet metal and is integrally formed along its side and top edges with inwardly projecting marginal flanges 51 and 52, respectively. The upper edge of the door may be reinforced by an angle-shaped member 53 having a flange 54 secured by rivets 55 to the top flange 52 of the door and a flange 56 disposed in a plane spaced inwardly from and substantially parallel with the plane of the door. This top reinforcing member and the side marginal flanges 51 extend inwardly equal distances from the door so that when the door is in open position they may engage the floor of the car to support the door in a substantially horizontal plane. The lower portion of the door is also provided with a reinforcing member 57 which may advantageously be a bulb angle. One flange or leg 58 of this angle extends inwardly from the door for the same distance as the top reinforcing member and side flanges of the door so that it may also engage the floor of the car when the door is in open position. The other leg or flange 59 of the member 57 extends downwardly from the flange 58 in a plane parallel with that of the door, being secured to the inner face of the latter by rivets 60. The free edge of this last-named flange preferably extends beyond the bottom edge of the door and is enlarged to form the bulb 61. The inwardly projecting flange 58 may advantageously be rigidly connected to adjacent portions of the side flanges 51 of the door by angle brackets 62. One leg of each angle bracket is secured to the inner face of the adjacent side flange by rivets 63 while the other leg thereof is secured to the lower face of the flange 58 by rivets 64. In this manner a very rigid door structure is produced and one which when in open position is supported on the floor of the car in a substantially horizontal plane so that material resting thereon will not tend to warp and distort it.

For movably associating the end door with the car the lower reinforcing member 57 is rigidly provided with means which preferably projects beyond adjacent portions of the side edges of the door. In the present embodiment of the invention this means is formed integral with the reinforcing member and comprises the bulb portion 61 which constitute trunnions 65. Although any suitable means may be rigidly secured to the side walls or floor of the car for cooperating with the trunnions 65 it is preferred to integrally form the lower portion of each corner post with a wall 66 spaced inwardly from and substantially parallel with the inwardly projecting portion 32 of the flange thereof. Thus the wall 66 and the adjacent portion of the flange of the corner post form a housing or slot into which the adjacent trunnion of the door may extend. The wall 66 and the adjacent portion of the flange 32 are preferably integrally connected by a portion 67 which extends parallel with and inwardly of the stem of the corner post and constitutes the end wall of the housing whereby substantial movement of the door transversely of the car is prevented. At its upper portion the wall 67 may advantageously be integrally connected to the stem of the corner post by a substantially horizontal portion 68.

To support the lower corners of the door when it is disposed in closed position each corner post may be formed with a horizontally disposed portion 69 upon which the associated trunnion of the door is adapted to rest. This portion 69 extends between the inwardly projecting portion 32 of the flange of the corner post and the wall 66 and serves to connect the lower portions of the latter and the wall 67 to the flange. The horizontal portion 69 is preferably provided with downwardly projecting extensions 70 and 71, the latter constituting a continuation of the wall 67, which terminate at the lower edge of the inwardly projecting portion 32 of the corner post and engage the upper surface of the inwardly projecting horizontal flange 8 of the angle member of the side sill. At its central portion the lower edge of the door rests upon and is supported by a bracket 72 which forms a part of the car floor and has lateral extensions 73 secured by rivets 74 to the center sill of the car. The main portion 75 of the bracket which extends transversely of the car and which is spaced above the extensions 73 may be conveniently connected to the latter by substantially upright legs 76. As will be obvious the upper surfaces of the portion 75 of the bracket and the portions 69 of the corner posts are disposed in the same plane so that when the door is in closed position it rests upon and is supported by each of these portions.

Although the walls 66 of the trunnion housings prevent substantial inward movement of the lower portion of the door adjacent the sides thereof it is desirable to provide means for preventing inward movement of the lower central portion of the door when the door is in closed position. It will be appreciated that the tendency for the lower central portion of the door to move inwardly is occasioned by severe draft and buffing shocks to which the car is subjected. The means employed in the present instance for preventing this inward movement of the door comprises a member 77 secured to the bracket 72 slightly inwardly of the door. This member is of angle-shape and has one leg 78 secured to the portion 75 of the bracket by rivets 79 and another leg 80 which extends upwardly adjacent the inner edge of the bulb portion of the reinforcing member 57. Outward movement of the lower portion of the door is, of course, prevented by the upwardly projecting flange 17 of the end sill, which overlaps the outer face of the door and the adjacent portion of the corner posts.

Figure 9:
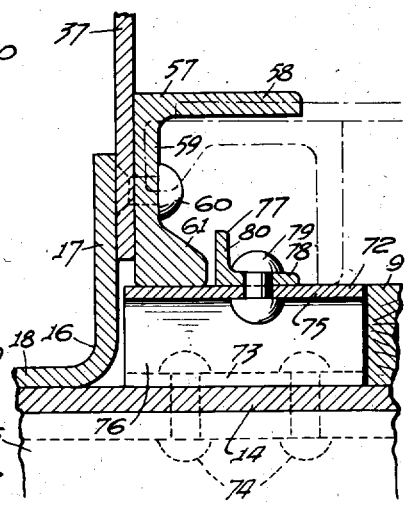
Figure 9 is a sectional view taken on line 9—9, Figure 1.
Figures 5, 6:
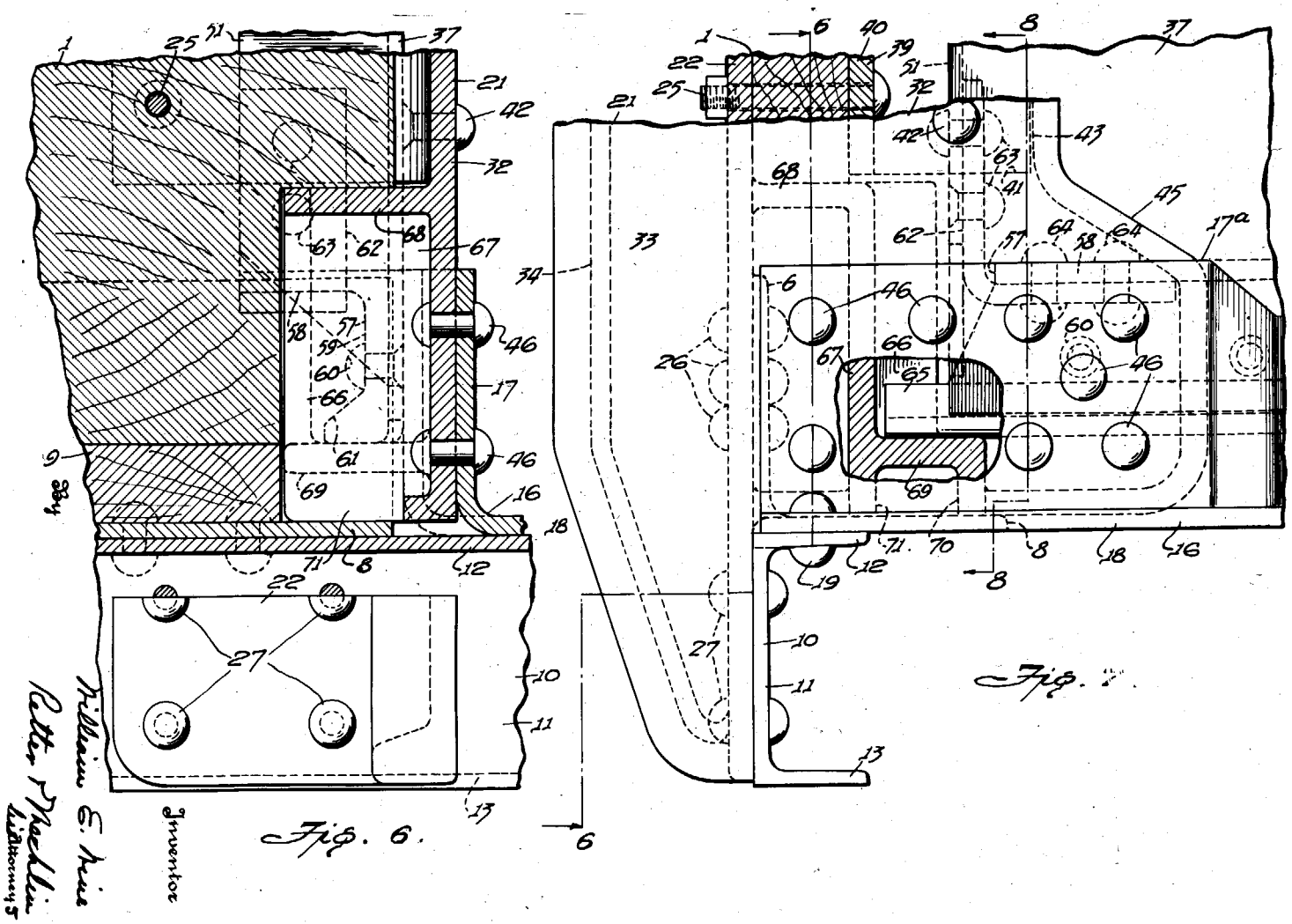
Figure 6 is a view, partly in section and partly in elevation, taken on line 6—6, Figure 7.

When the door is moved inwardly to open position it pivots or rotates about its trunnions 65 until the inwardly projecting flange 58 of the lower reinforcing member 57 contacts with the floor of the car. From this position until it assumes fully open position the door rotates about the free edge of the inwardly projecting flange 58 as a center causing the lower edge of the door and the trunnions thereof to move upwardly. The position the door occupies when in open position and the extent to which the trunnions have moved upwardly in their housings is fully shown in Figure 15. As shown in dotted lines in Figure 9 a portion of the outer edge of the flange 58 of the lower reinforcing member engages the bracket 72 when the door is in open position. Since it may be necessary to remove the door from the car for purposes of repair and replacement the upper ends of the trunnion housings are open so that the door may be readily lifted bodily from the car.

Secured to each of the upper corners of the door is a bracket 81 preferably of cast metal. This bracket has a plurality of plate-like portions 82 and 83, respectively, the former overlapping the outer face of the flange 54 of the door reinforcing member 53 and being secured thereto and to the top flange 52 of the door by rivets 84. The other plate portion 83 of the bracket is interposed between the door and the adjacent side wall of the car, being overlappingly secured to the adjacent side marginal flange 51 of the door by rivets 85. These plate portions of the bracket are preferably integrally connected by an additional plate portion 86 which overlaps the outer face of the door. In order that the plate portion 8 may contact with the inner face of the adjacent portion of the flange of the corner post the inturned rib 43, which is of a depth equal to the thickness of the plate portion 86, terminates below the bracket 82. Projecting outwardly from the portion 83 of the bracket is an upwardly extending lug 87 adapted to cooperate with means movably mounted on the side wall of the car for maintaining the door in closed position. The lug 87 may be conveniently reinforced by a rearwardly extending rib 88. The means cooperable with the lug comprises a latch or hook member 89 revolubly mounted on a boss 90 integrally formed with and projecting inwardly from the upper portion of the stem of the corner post. This boss is apertured and receives one of the rivets 31 employed for connecting the corner post and vertical flange of the top rail, and to prevent axial movement of the latch with respect to the boss a washer 91 may be interposed between the latter and the adjacent head of the rivet. This mechanism for maintaining the door in upright or closed position is of the type described and claimed in application Serial No. 413,050 filed jointly by Fred A. Isaacson and myself on December 10, 1929, and, like the latch shown therein, latch 89 is provided with ledges or shoulders 92 and 93 for respectively cooperating with lug 87 to maintain the door in partially closed and fully closed position, the ledges in the present mechanism, however, being spaced a greater distance apart for a purpose which will hereinafter appear.

The portion of the flange of the corner post adjacent the latch is apertured or cut away as at 94 to permit the free end of the latch to extend therethrough. The aperture is of such size that the portion of the corner post defining the lower portion thereof will support the latch in position to be engaged by the lug 87 when the door is moved from open to closed position. To maintain the latch in operative engagement with the door a cam 95 may be conveniently employed and it is preferably pivotally mounted upon a thimble 96, or the like, secured to the corner post by a rivet 97.

Means of a character similar to that described and claimed in said application Serial No. 413,050 is preferably provided for interlocking the side walls and each end door to prevent the sides from spreading due to lateral forces exerted by granular and other lading which may be carried in the car when the end doors are in closed position. However, as the side walls of the car often spread when the doors are in open position means is also preferably provided for drawing the sides of the car inwardly into their normal upright positions before the doors assume fully closed position. Although separate means may be employed for effecting these two results, namely, that of drawing the side walls inwardly and that of interlocking the side walls and door when the latter is in closed position it is preferred to employ one means for both purposes. In the present embodiment of the invention this means comprises lugs or members 98 and 99 respectively integrally formed with the corner post 21 and door bracket 81. The member 98 extends downwardly from the portion 49 of the corner post and inwardly from the adjacent portion of the flange thereof while the member 99 extends upwardly from the plate portion 82 of the bracket 81 adjacent the corner of the door. At its inner end the member 99 may be reinforced by ribs or flanges 100. It will be appreciated that these members constitute one of the two pairs employed at each end of the car.

Each member of each pair is fashioned with a plurality of offset surfaces 101 and 102 extending substantially parallel to the path of movement of the door and connected by a beveled or inclined surface 103. Each member is further provided with an additional beveled or inclined surface 104 leading to the adjacent surface 101. The manner in which these various surfaces of the members cooperate as the door is moved toward closed position is clearly illustrated in Figures 16, 17, and 18. Thus, when the door is moved toward closed position, the inclined surfaces 104 contact as illustrated in Figure 16, provided the sides have spread a relatively great amount. Since these surfaces extend obliquely with respect to the path of movement of the door closing movement of the door will draw the side walls inwardly and permit the door to assume the full-line position indicated in Figure 17. In this position it will be perceived that the surfaces 101 of the members are in engagement thereby interlocking the door and side walls and consequently preventing the latter from spreading outwardly into the position shown in Figure 16. It will, of course, be obvious that should the side walls not have spread the amount indicated in Figure 16 but only to the amount indicated in Figure 17 the door will immediately assume the position indicated in Figure 17 without surfaces 104 being brought into engagement. As the inclined surfaces 103 and 104 of the door member are respectively in engagement with the surfaces 104 and 103 of the corner post member continued closing movement of the door will cause the inclined surfaces of the door member to slide along the corresponding surfaces of the corner post member thereby further drawing the sides inwardly and permitting the door to assume the position indicated in Figure 18. In this last-named position it will be seen that the offset surfaces 101 and 102 of the door member are respectively in engagement with the offset surfaces 102 and 101 of the corner post member so that the side walls and door are in interlocking relation.

As considerable difficulty may be encountered in drawing the side walls inwardly by closing movement of the door, means may be conveniently provided whereby a removable pry lever may be employed. In the present form of the invention the upper portion of the stem of the corner post may be formed with a plurality of apertures 105 and 106, respectively, affording a plurality of fulcrum points for a removable lever 107. When the door is in the position indicated in Figure 16 the removable lever may be inserted in aperture 105 and caused to bear against the adjacent side marginal flange of the door. By moving the lever toward the door these two parts and the corner post will assume the position indicated in dotted lines in Figure 16. Thereafter the lever may be brought into cooperation with the aperture 106 and the door in the manner illustrated in full lines in Figure 17 and by suitably operating the lever, it, and the door and corner post, will assume the dotted line positions indicated in Figure 17. In order that the door may not be accidentally displaced from the position indicated in full lines in Figure 17 the ledge 92 of the latch is so arranged that it will operatively engage the lug 87 of the door to maintain the door in that position. The other ledge 93 of the latch is, of course, intended to engage the lug to maintain the door in the fully closed position indicated in Figure 18. By providing the means disclosed for drawing the side walls inwardly the removable lever may be employed to simultaneously effect this result and to move the door toward closed position.

From the forgeoing it will be perceived that rugged and simple means is provided for strengthening the ends of drop end door gondola cars, for maintaining the door in closed position, for drawing the side walls of the car inwardly and for interlocking the side walls with the door when the latter is in closed position.

I claim:

1. In a railway gondola car having a drop end door, the combination with the side walls of the car, of corner posts secured to the side walls, each of said corner posts having a plate portion adapted to overlap the outer face of the door and provided adjacent its lower portion with a wall spaced inwardly from said plate portion, said door being provided with trunnions projecting beyond adjacent portions of its side edges and respectively adapted to be interposed between said walls and plate portions of the corner posts for pivotally associating the door with the car, and means for supporting the door in closed position.

2. A railway gondola car having a drop end door adapted when in open position to overlap the floor of the car, the lower portion of the door being rigidly provided with means projecting beyond its side edges affording trunnions for pivotally mounting the door, housings rigid with the car sides for respectively receiving said trunnions, and means associated with the door for causing said trunnions to move upwardly within said housings when the door is moved to open position.

3. A railway gondola car having a drop end door adapted when in open position to overlap the floor of the car, an angularly shaped reinforcing member extending longitudinally of the door and secured to the lower portion thereof, said reinforcing member being integrally provided with reduced end portions affording trunnions for movably associating the door with the car and being also provided with a portion spaced above the trunnions about which the door is adapted to rotate before assuming fully open position.

4. A railway gondola car having a drop end door adapted when in open position to overlap the floor of the car, and a flanged reinforcing member having a portion secured to the lower portion of the door in overlapping relation to its inner face and also having a portion projecting inwardly therefrom above the lower edge of the door, said reinforcing member being integrally provided with reduced end portions projecting beyond the side edges of the door respectively affording trunnions for movably associating the door with the car body.

5. A drop end door for a railway gondola car, a reinforcing member having a flange rigid with the lower portion of the door and disposed in overlapping relation with the inner face thereof, said member also having a flange projecting inwardly from the inner face of the door above the lower edge thereof, said first-named flange being integrally provided with reduced end portions affording trunnions adapted to cooperate with means carried by the car for movably associating the door with the car, said trunnions being respectively disposed adjacent the lower corners of the door.

6. A drop end door for a railway gondola car involving an angularly-shaped reinforcing member extending along the lower edge thereof, said member having a flange projecting inwardly from the inner face of the door and having a flange extending downwardly from the first-named flange secured to the inner face of the door, said second named flange being provided with reduced end portions respectively projecting beyond adjacent portions of the sides of the door to cooperate with means for movably associating the door with the car.

7. A railway gondola car having a drop end door adapted when in open position to overlap the floor of the car, an angularly-shaped reinforced member secured to the door adjacent the lower edge thereof, said member having a flange overlapping the inner face of the door and a flange projecting inwardly therefrom, one of said flanges terminating adjacent the side edges of the door and the other of said flanges projecting beyond said side edges and having its ends reduced to afford trunnions for movably associating the door with the car.

8. A railway gondola car having a drop end door adapted when in open position to overlap the floor of the car, a member reinforcing the lower portion of the door, said member having an inwardly projecting flange about which the door is adapted to rotate before assuming fully open position and having a portion extending downwardly from said flange secured to the inner face of the door, and means rigid with said reinforcing member for pivotally associating the door with the car.

9. A railway gondola car having a drop end door adapted when in open position to overlap the floor of the car, a bulb angle reinforcing the lower edge of said door, the bulb portion of said angle projecing beyond adjacent portions of the side edges of the door to afford trunnions for pivotally associating the door with the car.

10. A railway gondola car having a drop end door provided with marginal flanges along its side edges, reinforcing means along the bottom edge of the door having a portion extending inwardly from the inner face above its lower edge, brackets respectively disposed adjacent the lower corners of the door for rigidly connecting adjacent portions of said flanges and the inwardly extending portions of said reinforcing means, and trunnions rigid with the end portions of said reinforcing means for movably associating the door with the car.

11. A railway gondola car having a drop end door, said door having marginal flanges along its side edges, and a reinforcing member secured to the inner face of the door and provided with a flange projecting inwardly therefrom, brackets respectively connecting said marginal flanges and the flange of said reinforcing member, and means rigid with said reinforcing member and projecting beyond the side edges of the door below said brackets for pivotally associating the door with the car.

12. A railway gondola car having a drop end door, said door having marginal flanges along its side edges, a member reinforcing the lower edge of the door, said member having an inwardly projecting flange about which the door is adapted to rotate before assuming fully open position and having a portion extending downwardly from the flange secured to the inner face of the door, and means respectively connecting said side flanges and the flange of said member.

13. A railway gondola car having a drop end door provided with marginal flanges on its side edges, and a bulb angle reinforcing the lower edges of the door, one flange of said angle projecting inwardly from the door and the other flange thereof projecting downwardly from the first-mentioned one and secured to the inner face of the door, said flanges terminating adjacent the side edges of the door and the bulb portion of said angle projecting beyond the side edges of the door to afford trunnions for pivotally associating the door with the car, the marginal flanges of the door being rigidly secured to the inwardly projecting flange of said bulb angle.

14. A railway gondola car having a drop end door adapted when in open position to overlap the floor of the car, trunnion means adjacent the lower corners of the door for pivotally associating the door with the car, means for causing said trunnions to move upwardly when the door is moved toward open position, and a member projecting upwardly from the floor of the car inwardly of and adjacent the central portion of the door, said member being adapted to prevent substantial inward movement of the lower portion of the door when the latter is in closed position.

15. A railway gondola car having a drop end door adapted when in open position to overlap the floor of the car, trunnions adjacent the lower corners of the door for pivotally associating the door with the car, means for causing said trunnions to move upwardly when the door is moved toward open position, a member rigid with the car having a portion disposed in overlapping relation with the inside of the lower central portion of the door when the door is in closed position for preventing substantial inward movement of the lower central portion of the door.

16. A railway gondola car having a drop end door adapted when in open position to overlap the floor of the car, a reinforcing member extending along the lower portion of the door on the inside thereof, said member being adapted to engage the floor of the car when the door is in open position to support the adjacent portion of the door in spaced relation to the floor and means rigid with the car having a portion adjacent the inside of the lower central portion of the door adapted to engage said reinforcing member when the door is in closed position for preventing substantial inward movement of the lower central portion of the door.

17. In a railway gondola car having a pivoted drop end door adapted when in open position to overlap the floor of the car, the lower portion of said door being provided with a reinforcing member having an inwardly projecting flange and also having a downwardly extending flange secured to the inner face of the door, a member projecting upwardly from the floor of the car beneath said inwardly projecting flange and in overlapping relation to the inner face of said downwardly extending flange, said second-named member being adapted to prevent substantial inward movement of the lower central portion of the door when the door is in closed position.

18. In a railway gondola car having a drop end door, the combination with the side walls of the car, of trunnions adjacent the lower corners of the door for pivotally associating the door with the car, a member extending transversely of the car engageable with the bottom edge of the door adjacent its central portion when in closed position, and a bracket secured to said member and projecting upwardly therefrom adjacent the inner face of the door adapted to prevent substantial inward movement of the lower central portion of the door when the door is in closed position.

19. In a railway gondola car having a drop end door adapted when in open position to overlap the floor of the car, the combination with the side walls of the car, of a member extending transversely of the car serving to support the door adjacent its central portion when in closed position, and a bracket secured to said member adapted to prevent substantial inward movement of the lower central portion of the door when the door is in closed position, and a reinforcing member extending along the lower edge of the door and provided with an inwardly projecting flange engageable with said transverse member when the door is in open position.

20. A railway gondola car havng a drop end door adapted when in open position to overlap the floor of the car, said door being provided with reinforcing means spaced above its lower edge about which means the door is adapted to rotate before assuming fully open position, said means being integrally provided with portions projecting beyond the side edges of the door for movably associating the latter with the car, and means for supporting the door adjacent its free edge when in fully open position.

21. A railway gondola car having a pivoted drop end door adapted when in open position to overlap the floor of the car, trunnions adjacent the lower portion of the door and respectively projecting beyond the side edges thereof, housings disposed within the car for receiving said trunnions to pivotally associate the door with the car, and means for causing said trunnions to move upwardly in the housings when the door is pivoted inwardly into fully open position, the upper ends of said housings being open to permit withdrawal of the trunnions therefrom to remove the door from the car.

22. In a railway gondola car having a drop end door, the combination with the side walls of the car, of an end sill having a substantially vertical portion adapted to overlappingly engage the outer face of the door, and corner posts respectively secured to said side walls and having flanges adapted to overlap the outer face of the door, portions of said flanges being interposed between the door and the vertical portion of the end sill, said interposed portions of the corner posts being secured to the end sills and being integrally provided with inwardly projecting ribs engageable with the outer face of the door.

23. In a railway gondola car having a drop end door, the combination with the side walls of the car, of side top rails respectively having substantially vertical and horizontal portions, and corner posts integrally formed with portions respectively secured to the inner face of the vertical portion of the top rail and to the upper face of the horizontal portion thereof, said corner posts also having portions adapted to overlap the outer face of said door.

24. In a railway gondola car having a drop end door, the combination with the side walls of the car, of side top rails respectively having substantially vertical portions, and corner posts having portions adapted to overlap the outer face of the end door, each of said corner posts also having a portion secured to the adjacent side wall and to the vertical portion of the adjacent top rail, said portion of the corner post overlapping the outer face of the side wall and the inner face of the vertical portion of the top rail.

25. In a railway gondola car having a drop end door, the combination with the side walls of the car, of side top rails respectively having vertical and horizontal flanges, corner posts having portions adapted to overlap the outer face of the door, each of said corner posts also having a substantially vertical flange provided with offset portions, one of said portions being secured to the adjacent side wall in overlapping relation to the outer face thereof and the other of said portions being secured to the vertical flange of the adjacent top rail in overlapping relation to the inner face thereof, and a latch pivotally mounted on said last-named portion and engageable with the door for maintaining the latter in closed position.

26. In a railway gondola car having a drop end door, the combination with the side walls of the car, of side rails respectively having substantially horizontal and vertical flanges, and corner posts having portions adapted to overlap the outer face of the door, each of said corner posts also having a portion secured to the car side in overlapping relation to the outer face thereof, a portion secured to the vertical flange of the side top rail in overlapping relation to the inner face thereof and a portion secured to the horizontal flange of the side top rail in overlapping relation to its upper face.

27. In a composite gondola car having a drop end door, the combination with the side walls of the car, each side wall involving a wooden siding, a top rail having a substantially vertical portion, and a plate extending longitudinally of the car between the siding and top rail, of corner posts, each of said corner posts having a flange secured to the outer face of the adjacent siding and to the inner faces of the adjacent plate and the vertical portion of the adjacent top rail.

28. In a composite gondola car having a drop end door, the combination with the side walls of the car, each side wall involving a wooden siding, a top rail having a substantially vertical portion, and a plate extending longitudinally of the car between the siding and top rail, of corner posts, each of said corner posts having a flange secured to the outer face of the adjacent siding and to the inner faces of the adjacent plate and the vertical portion of the adjacent top rail, said flange having outwardly projecting bosses for spacing the plate and top rail therefrom, said bosses being provided with rivet receiving apertures.

29. In a railway gondola car having a drop end door, the combination with the side walls of the car, of corner posts respectively having flanges secured to said side walls, each of said flanges being integrally formed with means extending into the car affording a pivotal support for means adapted to cooperate with the door for maintaining the latter in closed position.

30. In a railway gondola car having a drop end door, the combination with the side walls of the car, of corner posts respectively secured to said side walls, each of said corner posts having a flange adapted to overlap the outer face of the door, latches respectively carried by the car sides adapted to engage the door to maintain it in closed position, said flanges of the corner posts being provided with apertures through which said latches respectively extend, portions of the flanges bounding the apertures serving to support the latches when the door is in open position.

31. In a railway gondola car having a drop end door, the combination with the side walls of the car, of side rails having substantially horizontally disposed portions, and corner posts of substantially T-shape, the stem of the T being secured to the adjacent side wall, one portion of the flange of the T adapted to overlap the outer face of the door and another portion of said flange projecting outwardly beyond the adjacent side wall, said last-named portion of the flange and said stem being connected by a portion adapted to be secured to the horizontal portion of the adjacent top rail.

32. In a railway gondola car having a drop end door, the combination with the side walls of the car, of side top rails having horizontal flanges, and corner posts of substantially T-shape, the stem of the T being secured to the adjacent side wall, one portion of the flange of the T being adapted to overlap the outer face of the door and another portion of the flange projecting outwardly beyond the adjacent side wall, said last-named portion of the flange and the said stem being integrally connected by a portion secured to the horizontal flange of the adjacent side rail and said first-named portion of the flange being integrally connected to the stem by a portion adapted to have interlocking engagement with the door when the latter is in closed position to prevent the side walls from spreading.

33. In a railway gondola car having a drop end door, the combination with the side walls of the car, of corner posts respectively having flanges secured to the side walls of the car and flanges adapted to respectively overlap the outer face of the door, the flanges of each of said corner posts being integrally connected by a portion adapted to have interlocking engagement with the door when the latter is in closed position to prevent the side walls from spreading.

34. In a railway gondola car having a drop end door, the combination with the side walls of the car, of side top rails respectively having horizontal and vertical flanges, corner posts of substantially T-shape, the stem of said T being secured to the inner face of the vertical flange of the adjacent top rail, and means integrally connecting the stem and flange of each of said corner posts and secured to the upper face of the horizontal leg of the adjacent top rail.

35. In a railway gondola car having a drop end door adapted when in open position to overlap the floor of the car, the combination with the side walls of the car, of means rigid with the side walls adapted to cooperate with the door as the latter is moved toward closed position to draw the side walls inwardly.

36. In a railway gondola car having a drop end door adapted when in open position to overlap the floor of the car, the combination with the side walls of the car, of means adapted to draw the side walls inwardly as the door is moved toward closed position, said means including brackets rigid with the door and respectively disposed adjacent the side edges thereof.

37. In a railway gondola car having a drop end door adapted when in open position to overlap the floor of the car, the combination with the side walls of the car, of means adapted to draw the side walls inwardly as the door is moved toward closed position, said means including brackets mounted on the door adjacent the upper corners thereof and rigid means carried by the side walls engageable with said brackets.

38. In a railway gondola car having a drop end door adapted when in open position to overlap the floor of the car, the combination with the side walls of the car, of a plurality of pairs of members for interlocking the side walls and door when the latter is in closed position to prevent spreading of the side walls, one member of each pair being carried by the door and the other by the adjacent side wall, said pairs of members constituting means adapted to draw the side walls inwardly as the door is moved toward closed position.

39. In a railway gondola car having a drop end door adapted when in open position to overlap the floor of the car, the combination with the side walls of the car, of a plurality of pairs of members for interlocking the side walls and door when the latter is in closed position to prevent spreading of the side walls, the members constituting each pair being respectively carried by the door and side walls, one member of each of said pairs being provided with a beveled surface adapted to coact with the other member of its pair, said surface extending obliquely with respect to the path of closing movement of the door whereby said pairs of members are adapted to draw the side walls of the car inwardly as the door is moved toward closed position.

40. In a railway gondola car having a drop end door adapted when in open position to overlap the floor of the car, the combination with the side walls of the car, of a plurality of pairs of members for interlocking the side walls and door when the latter is in closed position, the members constituting each pair being respectively carried by the door and the side walls, one member of each pair being provided with a surface substantially parallel to the path of closing movement of the door and with a surface extending obliquely to said path, the other member of each pair being engageable with said oblique surface whereby when the door is moved toward closed position said pairs of members are adapted to draw the side walls inwardly, and the said other member of each pair being engageable with said parallel surface of the first-named member of its pair to prevent the walls from spreading when the door is in closed position.

41. In a railway gondola car having a drop end door adapted when in open position to overlap the floor of the car, the combination with the side walls of the car, of members operable in planes substantially parallel with said side walls for maintaining the door in closed position, and a plurality of pairs of members for interlocking the side walls and door when the latter is in closed position to prevent spreading of the side walls, one member of each pair being carried by the door and the other by the adjacent side wall, said pairs of members constituting means adapted to draw the side walls inwardly as the door is moved toward closed position.

42. In a railway gondola car having a drop end door adapted when in open position to overlap the floor of the car, the combination with the side walls of the car, of a plurality of pairs of members for interlocking the side walls and door when the latter is in closed position to prevent spreading of the side walls, one member of each pair being carried by the door and the other by the adjacent side wall, and means respectively mounted on one member of each pair and engageable with the other member of its pair for maintaining the door in closed position, said pairs of members constituting means adapted to draw the side walls inwardly as the door is moved toward closed position.

43. In a railway gondola car having a drop end door adapted when in open position to overlap the floor of the car, the combination with the side walls of the car, of a plurality of pairs of members for interlocking the side walls and door, one member of each pair being provided with surfaces offset with respect to each other and connected by a beveled surface, the other member of each pair being engageable with said beveled surface whereby when the door is moved toward closed position said pairs of members are adapted to draw the side walls inwardly, and the said other member of each pair being engageable with the offset surfaces of the first-named member of its pair to prevent the walls from spreading when the door is in closed position.

44. In a railway gondola car having a drop end door adapted when in open position to overlap the floor of the car, the combination with the side walls of the car, of a plurality of pairs of members for interlocking the side walls and door when the latter is in closed position to prevent spreading of the side walls, one member of each pair being provided with a plurality of offset beveled surfaces adapted to successively coact with the other member of its pair, said beveled surfaces extending obliquely with respect to the path of closing movement of the door whereby when the door is moved toward closed position said pairs of members are adapted to draw the side walls inwardly.

45. In a railway gondola car having a drop end door adapted when in open position to overlap the floor of the car, the combination with the side walls of the car, of a plurality of pairs of members for interlocking the side walls and door, one member of each pair being provided with a plurality of offset surfaces substantially parallel to the path of closing movement of the door and with a plurality of offset surfaces extending obliquely to said path, the other member of each pair being provided with an oblique surface successively engageable with said offset oblique surfaces whereby said pairs of members are adapted to draw the side walls inwardly when the door is moved toward closed position, and the said other member of each pair having a surface successively engageable with the first-named offset surfaces to prevent the side walls from spreading.

46. In a railway gondola car having a drop end door adapted when in open position to overlap the floor of the car, the combination with the side walls of the car, of a plurality of pairs of members for interlocking the side walls and door, each member of said pairs being provided with a plurality of offset surfaces substantially parallel to the path of closing movement of the door and with a plurality of offset surfaces extending obliquely to said path, the corresponding oblique surfaces of the members of each pair being respectively engageable whereby when the door is moved toward closed position said pairs of members are adapted to draw the side walls inwardly, and the corresponding parallel surfaces of the members of each pair being also respectively engageable whereby said pairs of members are adapted to prevent the side walls from spreading when the door is in closed position.

47. In a railway gondola car having a drop end door adapted when in open position to overlap the floor of the car, the combination with the side walls of the car, of means adapted to draw the side walls inwardly, as the door is moved toward closed position, and means including a removable lever for forcing the door toward closed position.

48. In a railway gondola car having a drop end door adapted when in open position to overlap the floor of the car, the combination with the side walls of the car, of a plurality of pairs of members for interlocking the side walls and door when the latter is in closed position to prevent spreading of the side walls, and means including a removable lever adapted to force the door toward closed position and to simultaneously draw the side walls inwardly.

49. In a railway gondola car having a drop end door adapted when in open position to overlap the floor of the car, the combination with the side walls of the car, of a plurality of pairs of members for interlocking the side walls and door when the latter is in closed position to prevent spreading of the side walls, and means carried by one of the side walls affording a fulcrum for a removable lever adapted to cooperate with the door to force the latter toward closed position, one member of each pair being provided with a beveled surface adapted to coact with the other member of its pair, said surface extending obliquely with respect to the path of closing movement of the door whereby when the door is forced to closed position by said lever the members of each pair are adapted to draw the side walls inwardly.

50. In a railway gondola car having a drop end door adapted when in open position to overlap the floor of the car, the combination with the side walls of the car, of a plurality of pairs of members for interlocking the side walls and door when the latter is in closed position to prevent the walls from spreading, one member of each pair being provided with a plurality of beveled surfaces extending obliquely with respect to the path of closing movement of the door adapted to successively coact with the other member of its pair, and means carried by one of the side walls affording a plurality of fulcrum points for a removable lever adapted to cooperate with the door to force the latter toward closed position, said lever being successively cooperable with said fulcrum points to cause the beveled surfaces of one member of each pair to successively cooperate with the other member of its pair to thereby draw the side walls of the car inwardly.

51. In a railway car having a drop end door adapted when in open position to overlap the floor of the car, the combination with the side walls of the car, means for supporting the door in a partially closed and a fully closed position, means carried by one of the side walls affording a fulcrum for a removable lever adapted to cooperate with the door to force the latter from partially closed to fully closed position, a plurality of pairs of members adapted to interlock the door and side walls, the members constituting each pair being respectively carried by the door and side walls, one member of each pair having relatively offset surfaces adapted to respectively coact with the other member of its pair when the door is in partially closed and fully closed positions to prevent spreading of the side walls, said offset surfaces being connected by a beveled surface extending obliquely to the path of closing movement of the door whereby when the door is forced from partially closed to fully closed position by said lever the members of each pair are adapted to draw the side walls inwardly.

52. In a railway gondola car having a drop end door adapted when in open position to overlap the floor of the car, the combination with the side walls of the car, of a plurality of members one of which is secured to the door and the other to the side wall, and means cooperable with said members for maintaining the door in closed position, one of said members being provided with means affording a fulcrum for a removable lever adapted to cooperate with the door to force the latter to closed position.

53. In a gondola car having a drop end door adapted when in open position to overlap the floor of the car, the combination with the side walls of the car, of corner posts respectively secured to said side walls, means movably carried by said corner posts and respectively cooperable with the door for maintaining the latter in closed position, each of said corner posts being formed with a portion affording a fulcrum for a removable lever adapted to cooperate with the door to force the latter toward closed position.

54. In a railway car, the combination of a floor, opposite side walls, a socket adjacent each wall near the floor of the car, a drop end gate provided with pintles engaging said sockets, and a rigid lug projecting above the floor between said side walls and positioned so as to retard inward deflection of the end gate.

WILLIAM E. WINE.